Dec. 2, 1924.
J. E. MATTSON
1,517,373
BEARING BURNING-IN MACHINE
Filed Aug. 15, 1923    5 Sheets-Sheet 2
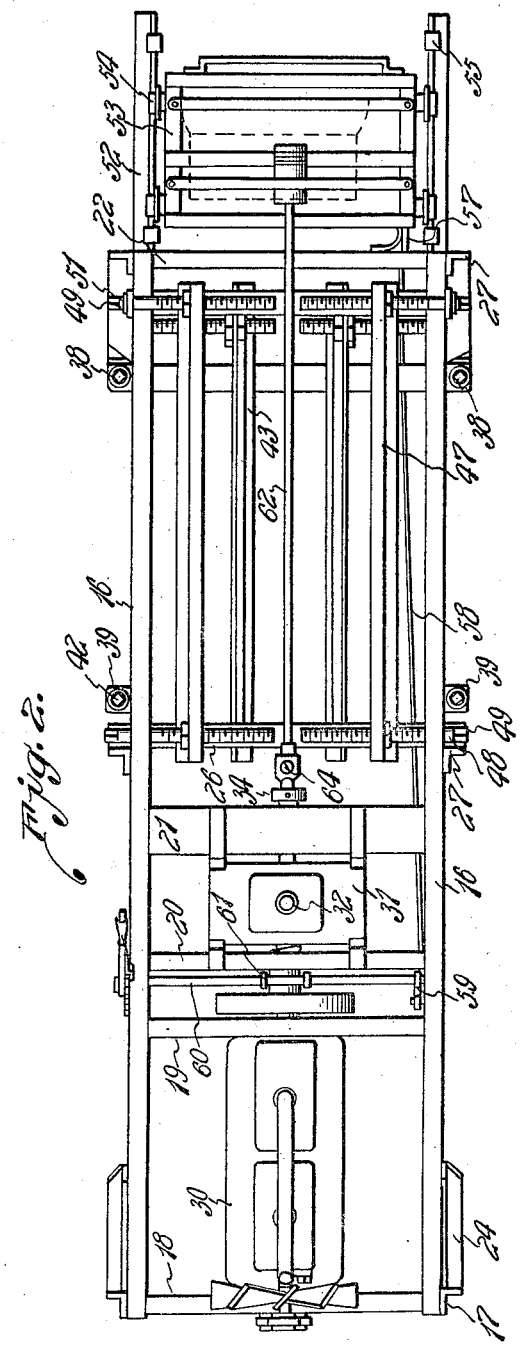
J. E. Mattson
INVENTOR
BY Victor J. Evans
ATTORNEY
WITNESS Dec. 2, 1924.

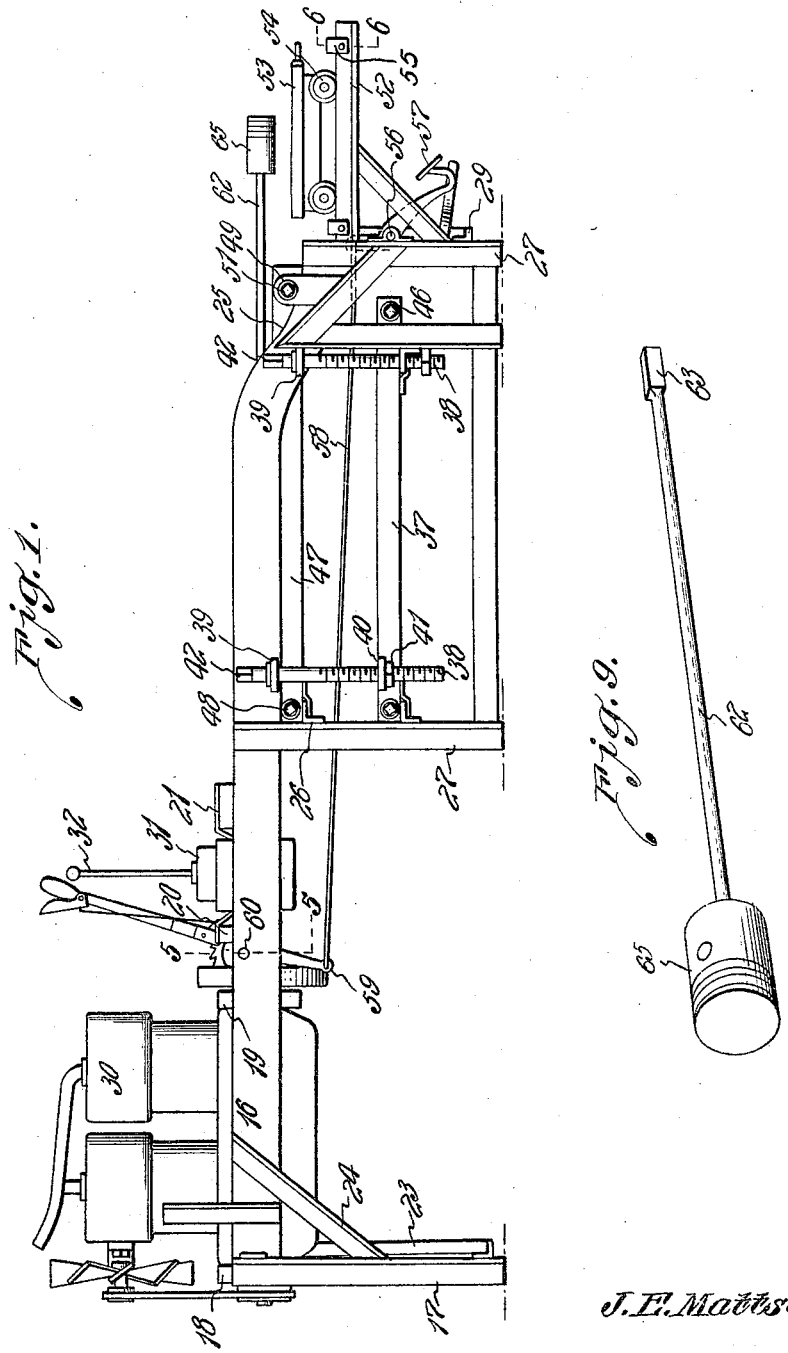

J. E. MATTSON 1,517,373

BEARING BURNING-IN MACHINE

Filed Aug. 15, 1923

J. E. Mattson
INVENTOR

BY Victor J. Evans
ATTORNEY

WITNESS:

Dec. 2, 1924.

J. E. MATTSON 1,517,373

BEARING BURNING-IN MACHINE

Filed Aug. 15, 1923

J. E. Mattson
INVENTOR

BY Victor J. Evans
ATTORNEY

WITNESS:

Dec. 2, 1924.
J. E. MATTSON
1,517,373
BEARING BURNING-IN MACHINE
Filed Aug. 15, 1923
5 Sheets-Sheet 5
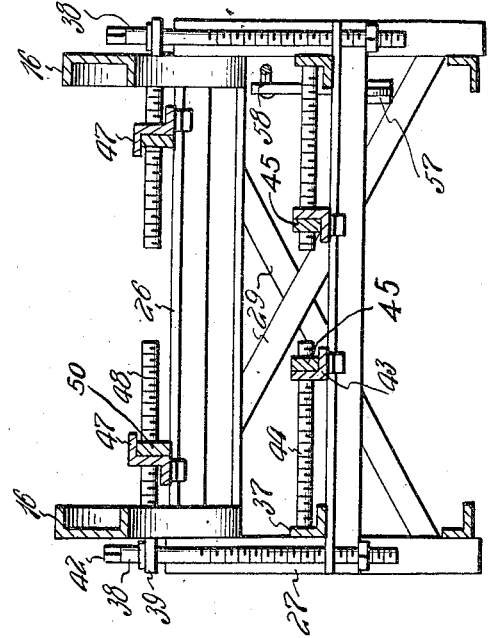
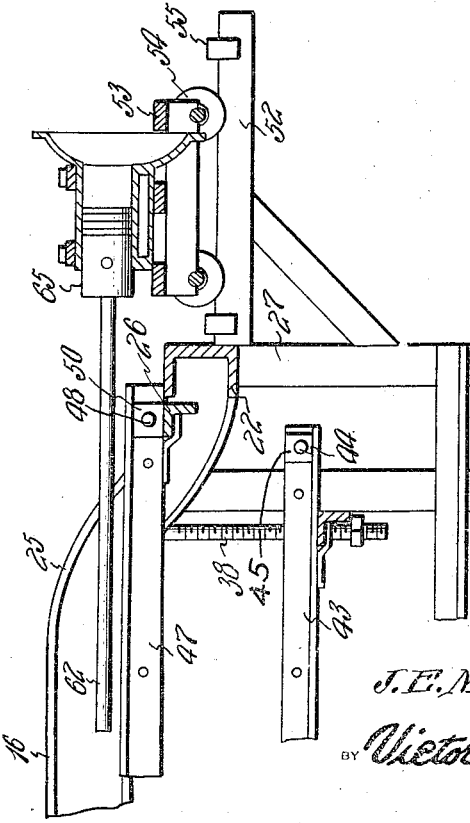

Patented Dec. 2, 1924.

1,517,373

UNITED STATES PATENT OFFICE.

JOBERT EMIL MATTSON, OF ELM CREEK, NEBRASKA.

BEARING-BURNING-IN MACHINE.

Application filed August 15, 1923. Serial No. 657,577.

*To all whom it may concern:*

Be it known that I, JOBERT E. MATTSON, a citizen of the United States, residing at Elm Creek, in the county of Buffalo and State of Nebraska, have invented new and useful Improvements in Bearing-Burning-In Machines, of which the following is a specification.

This invention relates to devices for burning-in the bearings of new or overhauled motors of automobiles, tractors and the like, and has for its object the provision of a novel apparatus including a stand provided with means for supporting an engine whose bearings are to be burned-in, the stand also carrying a motor adapted to be operatively connected with the crank shaft of the motor to be treated so as to drive the same and effect proper working in of all the bearings.

An important and more specific object is the provision of a machine of this character in which the motor support is peculiarly constructed and mounted so as to be capable of adjustment for properly holding engines of all kinds and sizes in a vise like manner which will be very secure.

Another object is the provision of a machine of this character provided with means for lapping-in pistons so that they will have a proper fit, the lapping-in means being driven by the motor which forms part of the apparatus.

An additional object is the provision of an apparatus of this character which will be comparatively simple and inexpensive in manufacture, highly efficient in use, durable in service and a general improvement in the art.

With the above and other objects and advantages in view the invention consists in the details of construction to be hereinafter more fully described and claimed and illustrated in the accompanying drawings, in which:

Figure 1 is a side elevation of the complete device,

Figure 2 is a top plan view thereof,

Figure 4 is a longitudinal section,

Figure 6 is a cross section on the line 6—6 of Figure 1,

Figure 7 is a horizontal section,

Figure 8 is a side elevation partly in section showing the device in use in lapping-in a piston.

Figure 5:
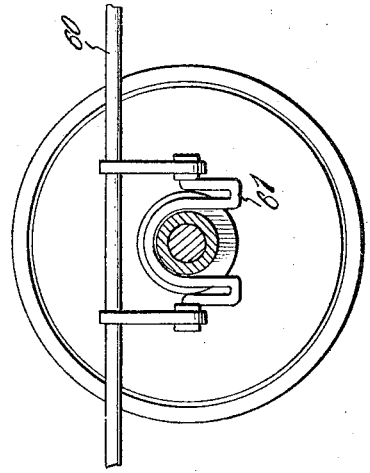
Figure 5 is a cross section on the line 5—5 of Figure 1.
Figure 3:
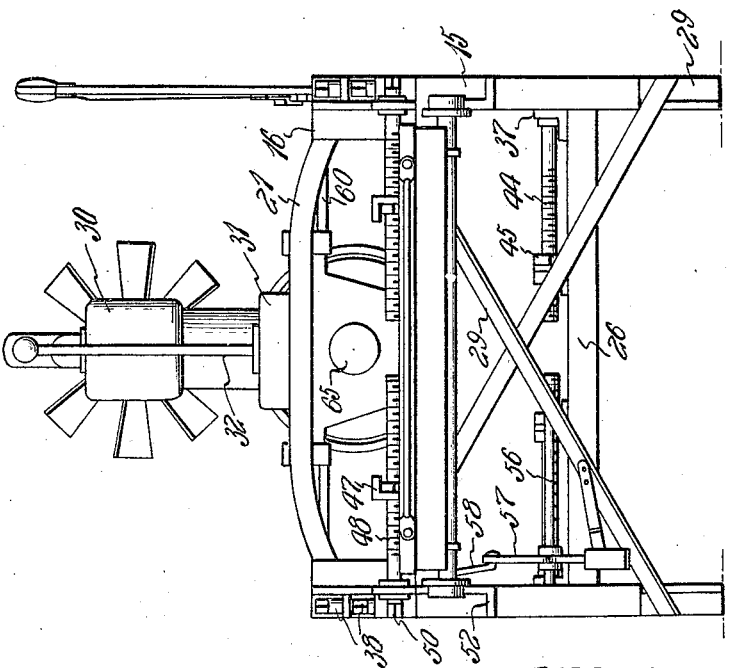
Figure 3 is a rear elevation.

The remaining figures are detail views.

Referring more particularly to the drawings I have shown my device as comprising a supporting stand designated broadly by the numeral 15 and including longitudinal bars 16 supported upon legs 17 and connected by transverse bars 18, 19, 20, 21 and 22, the first mentioned being at the forward extremity, the last mentioned being at the rear end and the others being spaced apart at intervals throughout the length of the frame. The legs 17 are at the forward end of the device and are connected by braces 23 and are reinforced by braces 24 which are connected with the side bars 16.

The rear ends of the bars 16 are offset downwardly as indicated at 25 and are additionally connected by spaced guide bars 26 which are for a purpose to be described. The rear portion of the frame includes three pairs of legs 27 connected at their lower ends by bars 28. The forward and rearmost pairs of legs 27 are connected by diagonal braces 29.

Mounted in the forward portion of the frame is an engine 30 of any ordinary or preferred type suitably carried by the frame members and of course provided with a fan, carburetor, radiator and other adjuncts necessary to be used in connection with internal combustion engines. Supported between the cross members 20 and 21 is a transmission case 31 containing the usual selective speed transmission such as is ordinarily used in connection with automobile engines and this transmission embodies a shifting lever 32 for controlling the forward speeds and the reverse. All this engine structure is not described in detail as it might be varied within such wide limits and it forms no part of the present invention. It should be stated that the drive shaft 33 leading from the transmission 31 carries a socket 34 connected with the drive shaft by a universal joint 35.

Movably mounted within the rear portion of the frame or stand is a frame which includes transverse bars 36 which are disposed slidably against the confronting faces of the forward and intermediate pairs of legs 27 and which are connected by longitudinal bars 37 which slidably engage against the inner sides of the opposite legs. The legs are here shown as being angular in cross section so as to have two flat bearing flanges against which these bars 36 and 37 bear while moving. This frame is intended to be adjusted vertically and for effecting such adjustment, I provide threaded rods 38 which are journaled through brackets 39 on the frame bars 16 and which pass through holes in brackets 40 on the bars 37. Engaged on these threaded rods are nuts 41 located below the brackets 40 and bearing against the adjacent legs 27. Above the brackets 39 these rods are formed with squared extensions 42 engageable by a socket wrench whereby the rods may be turned for raising or lowering this movable frame.

Slidably mounted upon the transverse bars 36 are longitudinally extending bars 43 which are adjusted toward or from each other by means of threaded rods 44 which are rotatable through the bars 37 and which pass through the bars 43, nuts 45 being threaded onto these rods and mounted stationarily at opposite sides of the bars 43. The projecting outer ends of these rods 44 terminate in squared extensions 46 engageable by a socket wrench for effecting turning to adjust the position of the bars 43.

Slidably mounted upon the guide bars 26 are longitudinally extending bars 47 adjustable toward and from each other by threaded rods 48 which are journaled through brackets 49 on the side bars 16 and which pass through the bars 47, nuts 50 being provided which are located at opposite sides of the bars 47. The ends are formed with extensions 51 which are squared for engagement by a socket wrench for effecting turning and making the desired adjustment.

Secured to and projecting rearwardly from the back of the frame are horizontally disposed guide rails 52 on which is mounted a carriage 53 equipped with rollers 54 bearing on the rails 52 and further equipped with stops 55 which will limit the movement of the carriage. The carriage 53 is designed to support an engine during the process of lapping-in the pistons as will be hereinafter described.

At some suitable point on the rear of the frame is a support 56 on which is provided a pedal 57 having connected therewith a reach rod 58 which extends forwardly and which is connected with an arm 59 depending from a rock shaft 60 which is journaled across the frame between the cross bars 19 and 20. This rock shaft carries a fork 61 which extends down and which controls the clutch of the motor 30.

In the use of the device the engine whose bearings are to be burned-in is placed within the rear portion of the frame so as to rest upon the longitudinal bars 43 and these bars are adjusted toward or from each other by means of the rods 44 so that they will properly support the engine. The rods 48 are then turned to bring the bars 47 into clamping engagement with the sides of the engine so as to hold it firmly. The upright rods 38 are then turned to raise the engine or lower it, whichever is necessary to bring its crank shaft in substantial alignment with the drive shaft 33. The socket 34 carried by the drive shaft is then engaged with the forward end of the crank shaft to be treated. When the motor 30 is subsequently operated, it is quite apparent that the motor to be treated will be driven so that all the bearings and other moving parts will be worked-in and the fit consequently made perfect. This method of burning-in or working-in possesses great advantages over attempting to operate the motor under its own power, as is well known especially as there is no appreciable danger of injuring the bearings of a new motor or of one just overhauled. Furthermore it is often impossible to start a stiff motor either by hand or by means of a starter whereas the application of power derived from an auxiliary motor such as I provide removes all difficulties in this line.

For lapping-in pistons, the engine is removed from the clamping frame structure above described and is laid upon the carriage 53. I then make use of the tool shown in one of the detail figures, which tool consists of a long rod 62 terminating at one end in a head 63 which is designed to be engaged within the socket 34 and clamped therein by a set screw 64 or the like. The other end of this rod carries a lapping tool 65 which corresponds in size to the piston to be used in the motor, or, if preferred, instead of using a lapping tool the piston to be lapped-in may be connected with the rod. Assuming that the tool is inserted in the socket and that the engine block is lying upon the carriage 53, when the engine 30 is operated, it is apparent that the lapping tool, or piston as the case may be will be rotated. Naturally, at the beginning of the lapping-in operation, the carriage 53 must be moved rearwardly so that the tool 65 may be inserted within the proper cylinder. When the engine 30 is rotating the operator moves the carriage 53 back and forth so as to reciprocate the engine block with respect to the rotating lapping tool and in this way the cylinder is properly dressed or the piston is properly lapped-in so that there will be absolutely perfect fit. The pedal 57 is provided for the convenience of the operator so that he may, from the rear of the machine, control the clutch of the motor which drives the lapping tool or the motor whose bearings are being burned-in.

From the foregoing description and a study of the drawings it will be apparent that I have thus provided a simply constructed and very easily operated machine which will be highly advantageous for use in working-in the moving parts and burning-in the bearings as well as lapping-in the pistons of an engine. Owing to the adjustability of the various parts of the movable frame structure it is apparent that engines of widely different sizes and types may be rigidly clamped and held against any possible displacement during the treating operation. In actual practice it is conceivable that the machine may be so built as to take care of all kinds of engines used on pleasure vehicles or light commercial vehicles, while a larger size might be provided for working upon heavy trucks and tractors, and if necessary certain variations in the construction of the parts may be made to widen the field of usefulness and adaptability of the device. The device is bound to be a great time and labor saver and will expedite the burning-in of bearings without there being any danger of injuring the bearings by overheating, in the endeavor to run a new or rebuilt motor under its own power.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In a machine of the character described, a supporting frame, an engine and transmission mounted upon one end thereof, a carriage mounted for movement longitudinally upon the frame and adapted to support an engine block, and means connected with the engine and adapted to rotate a piston engaged in a cylinder of the engine block whereby to effect lapping of pistons in the cylinder.

2. In a machine of the character described, a supporting frame, an engine and transmission mounted upon one end thereof, a carriage mounted for movement longitudinally of the frame and adapted to support an engine block, and a shaft connected with said transmission and adapted to carry and rotate a piston for the engine on the carriage, the carriage being moved while the piston is rotated whereby to lap in the piston.

3. A machine of the character described comprising a stationary frame, an engine mounted upon one end thereof and having a clutch device and a transmission, a frame mounted for vertical movement within the other end of said stationary frame, longitudinally disposed horizontal clamping members movably mounted toward and from each other on said vertically movable frame whereby to clamp an engine, and means for connecting the shaft of an engine on said movable frame with the shaft of the transmission, guide bars extending across the rear portion of said frame, and a pair of longitudinally extending horizontal clamping bars adjustably mounted thereon for gripping the engine.

4. In a device of the character described, a stationary frame, a motor mounted upon one end thereof and having a speed change transmission and control clutch, a frame movably mounted within the other end of the stationary frame and carrying clamping means for holding an engine, and means on the drive shaft of the transmission for connection with the shaft of a motor on said movable frame, a control pedal pivoted at the rear end of the frame, and an operative connection between said pedal and the clutch for controlling the clutch from the rear of the frame.

5. A machine of the character described comprising a stationary frame, an engine mounted upon one end thereof and having a clutch device and a transmission, a frame mounted for vertical movement within the other end of said stationary frame, longitudinally disposed horizontal clamping members movably mounted toward and from each other on said vertically movable frame whereby to clamp an engine, and means for connecting the shaft of an engine on said movable frame with the shaft of the transmission, the adjusting means for the movable frame consisting of elongated threaded rods swivelly mounted on the stationary frame and having a nut connection with the movable frame.

6. In a machine of the character described, a stationary frame, an engine mounted upon one end thereof and having a speed change transmission and a clutch, a vertically movable frame guidably mounted in the rear end of said stationary frame, longitudinal bars slidably mounted with respect to and forming a part of said movable frame, threaded rods for moving said bars toward and from each other, transverse bars secured on the stationary frame above the movable frame, longitudinally extending horizontal bars slidable on said transverse bars, threaded rods for moving said last named bars toward and from each other for clamping an engine disposed upon the movable frame, and means for connecting said transmission with the crank shaft of an engine held on the movable frame.

7. In a device of the character described, a stationary frame, an engine mounted upon one end thereof and having a speed change transmission and a clutch, a frame vertically slidably mounted within the other end of said stationary frame and provided with means for clamping an engine thereon, screw means for raising and lowering said movable frame, and means for connecting the transmission with the crank shaft of an engine on the movable frame, and a control at the rear end of the frame for controlling the clutch.

8. In a machine of the character described, a supporting frame, an engine and transmission mounted upon one end thereof, rails on said frame, a carriage mounted for forward and rearward movement on said rails and adapted to support an engine block, whereby to effect lapping of pistons in the cylinders.

9. In a machine of the character described, a supporting frame, an engine and transmission mounted upon one end thereof, a support within the other end of the frame, screw means at each side of said support for raising and lowering the same, said support being adapted to carry an engine to be worked in, and longitudinally extending clamping bars carried by said support and movable independently whereby to clampingly engage and center an engine with respect to the engine on the frame.

10. In a machine of the character described, a supporting frame, an engine mounted on one end thereof, brackets at the other end of the frame, bars extending transversely of the frame, vertical threaded rods journaled through said brackets and having threaded connection with said bars for raising and lowering the same, said bars being adapted to support an engine to be worked in, bars extending longitudinally of the frame and slidable longitudinally of said transverse bars for clamping an engine, and horizontally disposed screws passing through said last named bars for effecting adjustment thereof.

11. In a device of the character described, a stationary frame, a motor mounted upon one end thereof and having a variable speed transmission and control clutch, means at the other end of the frame for holding an engine to be worked in, means on the drive shaft of the transmission for connection with the shaft of the engine to be worked in, and a control pedal mounted at the rear end of the frame and having an operative connection with the clutch of the first named engine for controlling the same from the rear of the machine.

In testimony whereof I affix my signature.

JOBERT EMIL MATTSON.